Patented Apr. 2, 1935

1,996,072

UNITED STATES PATENT OFFICE 1,996,072

MANUFACTURE OF ARTICLES OF OR CONTAINING RUBBER OR SIMILAR MATERIAL

Allan Stuart King, Sutton Coldfield, England, assignor to American Anode Incorporated, Akron, Ohio, a corporation of Delaware No Drawing. Application February 27, 1931,
Serial No. 518,894. Renewed June 13, 1934.
In Great Britain April 22, 1930

9 Claims. (Cl. 18—58)

This invention concerns improvements in the manufacture of articles of or containing rubber or similar material by forming deposits of aqueous dispersions thereof on supports or backing strata previously coated with a coagulating medium comprising a coagulant for the aqueous dispersions aforesaid in admixture with substances having wetting properties in presence of the coagulant.

The invention comprises coating support or backing strata which may be shaped, such as formers or moulds, with the coagulating medium comprising a coagulant for the aqueous dispersions in admixture with substances having wetting properties in presence of the coagulant and thereafter coating the thus treated supports or backing strata with aqueous dispersions of the kinds hereinafter specified.

The prior coating of coagulating medium effects or facilitates the coagulation of the dispersions subsequently applied. If desired, the coagulation of the coatings of dispersions aforesaid may be aided by the application of further coagulating means as, for example, by subsequent contacting with the same or a different coagulant as, for instance, immersions in dilute acetic acid.

The invention also includes the manufacture of articles of appreciable thickness by repeated coatings with the aqueous dispersions aforesaid and a coagulating medium.

The coagulating medium as well as the aqueous dispersions aforesaid can be applied by any one or more of the known operations of dipping, pouring, spreading or spraying. The supports or backing strata or formers may be of any suitable material such as glass, metal or porcelain.

The use of coagulating media comprising a coagulant for the aqueous dispersions aforesaid in admixture with substances having wetting properties in the presence of the coagulant reduces the usual tendency of a latex deposit to drain away from sharp or rounded surfaces, for example, the edges of a tobacco pouch former. Furthermore, in those cases wherein the outer surface of the deposit does not come into contact with any external setting or coagulating medium the natural glossy character of the outer surface of the fluid deposit is retained after solidification.

The emulsions or dispersions comprise natural or artificial aqueous dispersions of rubber or similar vegetable resins such as gutta-percha or balata with or without the addition of aqueous dispersions or emulsions of rubber-like substances such as the so-called synthetic rubbers, mineral rubbers or rubber substitutes such as factice or rubber reclaim, or rubber waste or oils, for example, rape oil or vulcanized oils or cellulose esters or proteins, for example, casein.

The main dispersions may be concentrated and/or compounded or compounded and subsequently concentrated.

The compounding ingredients may be chosen from vulcanizing agents such as sulphur, fillers, reinforcing agents, such as whiting clay, barium sulphate, lithopone lamp black, gas black, zinc oxide or even powdered ebonite or vulcanite, accelerators of vulcanization, colouring matters, preservatives or softeners.

Aqueous dispersions of synthetic rubber with or without any one or more of the hereinbefore mentioned compounding ingredients, may also be used.

Coagulants found suitable for this invention are for instance, acids and salts of di- and trivalent metals.

Substances which promote wetting in the presence of coagulants are, for example, casein, glue and saponin.

Formers readily attacked by the coagulant can also be used if these are first provided with a protective film sufficiently impervious to the reactive liquids. For instance, a metal former may be dipped into an ordinary alkaline latex or better still into the actual latex mixing to be used diluted if desired, and the aforesaid coating dried prior to the application of the coagulating medium.

If desired the formers may be internally heated in any suitable manner, for example, by passing a fluid heating medium through the moulds or by electrical heating.

The reagents employed as coagulants may be such as only become effective on heating, as for example, ammonium persulphate.

An example of carrying the invention into effect is as follows:—

An acetic acid casein solution having good wetting properties is made up to have the following composition:—

| | Parts by weight |
|---|---|
| Glacial acetic acid | 20 |
| Water | 80 |
| Casein | 1 |

A glazed porcelain former is then dipped into this coagulating solution, withdrawn and allowed to drain for a few seconds and then dipped into a latex mixing containing for example, 60% total solids and of the following composition:—

| | Parts by weight |
|---|---|
| Rubber | 89.2 |
| Sulphur | 2.5 |
| Accelerator | 0.3 |
| Zinc oxide | 2.0 |
| Mineral oil | 5.0 |
| Pigment | 1.0 |

The dipped former is allowed to remain immersed in this mixing for five to twenty minutes according to the thickness of the deposit required. It is then withdrawn inverted and allowed to stand. Within 30 to 60 seconds after removal the deposit sets throughout and may be dried and vulcanized in known manner.

This invention has been found applicable to the manufacture of articles of rubber of moderate or substantial thickness such as, for example, tobacco pouches, gloves, etc.

What I claim is:

1. A process for the manufacture of rubber goods from aqueous dispersions of rubber which comprises coating an impervious form with a film of a coagulant composition containing a wetting agent in a proportion insufficient to solidify the composition, and associating the coated form with an aqueous dispersion of rubber.

2. A process for the manufacture of rubber goods from aqueous dispersions of rubber which comprises coating an impervious form with a film of a coagulant composition containing a colloidal wetting agent in a proportion insufficient to solidify the composition, and immersing the coated form in an aqueous dispersion.

3. A process for the manufacture of rubber goods from aqueous dispersions of rubber which comprises coating an impervious form with a film of a solution comprising a wetting agent in a proportion insufficient to solidify the solution and a coagulant selected from the class consisting of acids and salts of di and trivalent metals, and immersing the coated form in an aqueous dispersion of rubber.

4. A process for the manufacture of rubber goods from aqueous dispersions of rubber which comprises coating an impervious form with a film of a solution comprising a coagulant selected from the class consisting of acids and salts of di and trivalent metals and a wetting agent selected from the class consisting of glue, casein and saponin in a proportion insufficient to solidify the solution, and immersing the coated form in an aqueous dispersion of rubber.

5. In the manufacture of rubber goods from aqueous dispersions of rubber, the steps of providing a form with a layer of an aqueous dispersion of rubber, and treating the surface of the said layer with a coagulant solution comprising a wetting agent.

6. In the manufacture of rubber goods from aqueous dispersions of rubber, the steps of applying a plurality of layers of an aqueous dispersion of rubber to a form, and treating each successive layer with a coagulant solution comprising a wetting agent.

7. A process for the manufacture of rubber goods from aqueous dispersions of rubber which comprises coating an impervious form with a film of a coagulant solution comprising a wetting agent, immersing the coated form in an aqueous dispersion of rubber, coating the form with its deposit of rubber again with the coagulant solution and repeating the steps until a layer of rubber of the desired thickness is formed.

8. A process for the manufacture of rubber goods from aqueous dispersions of rubber which comprises coating an impervious form with a film of a solution comprising a coagulant and a wetting agent in a proportion insufficient to solidify the solution, immersing the coated form in an aqueous dispersion of rubber until a layer of rubber is coagulated thereon, and finally removing the rubber from the form.

9. A process for the manufacture of rubber goods from aqueous dispersions of rubber which comprises coating an impervious form with a film of a solution comprising a coagulant and a colloidal wetting agent in a proportion insufficient to solidify the solution, immersing the coated form in an aqueous dispersion of rubber until a layer of rubber is coagulated thereon, and finally removing the rubber from the form.

ALLAN STUART KING.